Feb. 23, 1960 N. H. KRAMER ET AL 2,926,339
SWITCHING APPARATUS
Filed Oct. 28, 1955 2 Sheets-Sheet 1

*INVENTOR.*
NOAH H. KRAMER
HARRY W. MATHERS
*BY* Dewey J. Cunningham
ATTORNEY

*INVENTOR.*
NOAH H. KRAMER
HARRY W. MATHERS
*BY* Dewey J. Cunningham
ATTORNEY

United States Patent Office 2,926,339

Patented Feb. 23, 1960

2,926,339

SWITCHING APPARATUS

Noah H. Kramer and Harry W. Mathers, Johnson City, N.Y., assignors to International Business Machines Corporation, New York, N.Y., a corporation of New York Application October 28, 1955, Serial No. 543,504

8 Claims. (Cl. 340—174)

This invention relates to storage devices for handling binary data, and to a plurality of such devices which may be arranged to perform logical switching functions.

Increasing use is being made of solid state devices such as magnetic cores and transistors in digital computers. Magnetic cores of the type capable of assuming alternate states of stability in representing binary information have the ability to store this information for long or short intervals of time with extreme reliability. Furthermore, the only power required is that used to set the core to a desired state. Once entry into the core is made no power is required to maintain continued storage. Transistors are capable of performing various logical switching functions with low power consumption and at high speeds. Both magnetic cores and transistors have a long life as well as small size and weight.

It is only logical that circuits utilizing a combination of magnetic cores and transistors can afford computer components possessing the advantages of each. For example, transistors have been used as driving devices for switching cores from one to the other of their alternate states of stability. However, considerable difficulty is encountered in providing such an arrangement which is both reliable and capable of relatively high speeds of operation. This is due largely to the fact that considerable power is required to switch the core from one state to another, and present day transistors are definitely limited in their power handling capabilities. The present invention relates to a circuit arrangement in which the pulse power requirement to obtain a useful output signal is many times smaller than with known circuits. Furthermore, the present invention affords operation from short duration signals.

According to the invention, a saturable magnetic core is provided with an input winding to which signals are applied for switching the core from one of its stable states to the other. A transistor device having a source of potential thereacross and including a reset winding on said core in circuit therewith, is used in combination with a regeneration winding to return the core to said one stable state. A capacitor is furnished such that one of its sides is connected to a reference and the other side is connected to a point between one terminal of said power source and said reset winding. The arrangement is such that a triggering pulse is applied in a manner to cause said transistor device to turn on and produce a current flow through said reset winding. The capacitor, which has been charged from said power source, begins to discharge through said reset winding to produce even more current flow therethrough. The transformer action between the reset winding and the regeneration winding is such as to cause the transistor device to conduct more heavily. The above action results in the core being returned to said one stable state. At this time the capacitor is charged from the power source and is in readiness for another switching operation. Where a number of these devices are to be used, the charging of said capacitor may be through the input winding of a second core for switching that core to another stable state.

An object of the invention is to provide an improved switching arrangement utilizing magnetic cores.

Another object is to furnish a magnetic core switching network capable of reliable operation with short duration signals.

Still another object of the present invention is to provide an improved solid state shifting register.

A further object of this invention is to furnish an improved magnetic core switching arrangement utilizing transistor devices where the power handling requirement for the transistor devices is very small.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference numerals represent similar parts throughout the several views.

Figure 1:
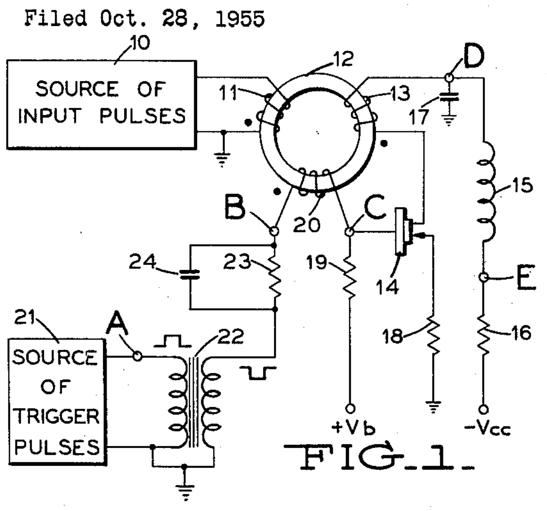
Fig. 1 is a schematic diagram of a basic switching arrangement of the present invention.

Referring to Fig. 1, a source of input pulses 10 is illustrated in block form. These pulses may be derived from any suitable means. As illustrated, positive input pulses are applied to an input winding 11 on a magnetic core 12. This core is of the type previously described and may have a hysteresis characteristic such as that shown in Fig. 2. A positive pulse to winding 11 is adapted to switch core 12 from point "*a*" on the hysteresis loop to point "*b*". For the present description, the core will be said to be in a "0" state when it is at point "*a*" and a "1" state when it is at point "*b*." A winding 13 is provided on core 12 and is arranged in the collector circuit of a PNP transistor device 14. An inductance element 15 and a resistor 16 are arranged in series between one end of winding 13 and a negative source of D.C. potential —V*cc*. A capacitor 17 is arranged with one of its sides connected to a point between winding 13 and inductance element 15, the other side of the capacitor being connected to a reference potential which in the present instance is ground. However, other reference potentials, such as —V*cc*, could be used instead of ground.

The emitter of transistor 14 is connected to ground through a suitable resistor 18 and the transistor is normally biased off by means of a D.C. potential +V*b* which is connected to the base of the transistor through a resistor 19.

A regeneration winding 20 is formed on core 12 and has one end thereof connected to the base of transistor 14, the other end of said winding being adapted to receive pulses from a source of trigger pulses designated by reference numeral 21. These pulses are supplied through a transformer 22 to one end of a parallel RC network comprising a resistor 23 and a capacitor 24, the other end of said network being connected to said other end of winding 20. The dot markings adjacent to one end of each of the windings on core 12 indicates that that end is negative on write and positive on read pulsing of the core. Write pulsing is used to switch the core from a "0" to a "1" state and read pulsing is used to interrogate the condition of the core. If it is a "1" state, a read pulse will return the core to the "0" state the dot markings are used in a similar manner in the other drawings.

Figure 2:
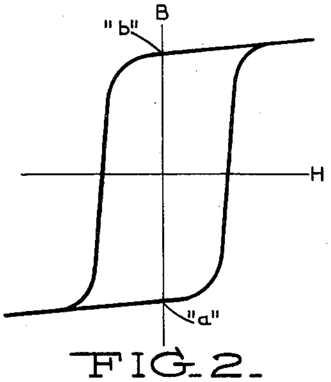
Fig. 2 shows the characteristic hysteresis loop for a saturable magnetic core such as that which may be used in the present invention.

The operation of the switching arrangement shown in Fig. 1 will now be described in detail. Let it be assumed that a positive pulse has been applied to winding 11 from source 10 and has switched core 12 to state "*b*" as shown in Fig. 2. Capacitor 17 will normally be charged from source $-Vcc$ so that the ungrounded side thereof will be at some negative potential. Since transistor 14 is held off by the bias voltage $+Vb$, substantially no current can flow through winding 13 from the transistor collector electrode to the capacitor. At read time, a positive trigger pulse from source 21 is inverted by transformer 22 to produce a negative input pulse to the base of the transistor. This negative pulse finds a low impedance path through capacitor 24 and regeneration winding 20 and drops the potential at the base of the transistor below ground. At this time the transistor is turned on and current begins to flow out of the collector through winding 13 and into capacitor 17. Since capacitor 17 is normally charged negatively it serves well as a power source for the collector and much current can be drawn through winding 13 to begin switching the core back to state "*a*" as shown in Fig. 2. When this begins, there is a transformer action between winding 13 and regeneration winding 20 which causes the base of the transistor to be driven even further negative. This increases the current flow through winding 13 and aids in driving the core to state "*a*." During regeneration, capacitor 24 is charged to a positive voltage. When regeneration is complete, this voltage is applied to the base of the transistor to turn the transistor off. This voltage from capacitor 24 reduces the carrier storage effect on the turn-off time of the transistor, thus permitting higher frequency operation and a better time relationship between the read-in and readout currents in the core. After regeneration is completed and the core is switched, current begins to flow heavily from source $-Vcc$ through resistor 16 and inductance element 15 to recharge capacitor 17.

Figure 3:
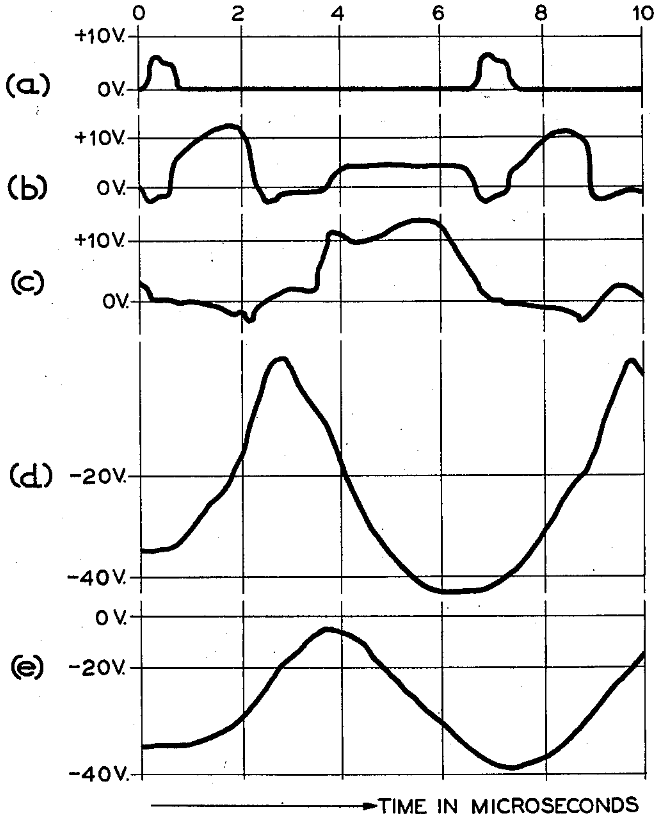
Fig. 3 shows a plurality of waveworms representative of the action taking place at various terminals in Fig. 1 under certain conditions.

The waveforms at (*a*), (*b*), (*c*), (*d*) and (*e*) shown in Fig. 3 are produced at terminals A, B, C, D and E, respectively, in Fig. 1 when a "1" is read from core 12 and another "1" is written into the core thereafter. All of the waveforms are somewhat idealized but do provide a clear indication of the circuit operation. It will be seen that a positive trigger pulse at terminal A causes an initial negative pulse at terminal B which is substantially the inverse of the trigger pulse. During this time, the base of the transistor which is connected to terminal C, begins to drop below ground from its $+Vb$ level. After the base goes below ground, the transistor begins to conduct and current flows from the collector electrode of the transistor through winding 13 and into capacitor 17. As shown in Fig. 3, this action causes the voltage at terminal D to rise toward ground.

As soon as the core begins to change states, the transformer action to the regeneration winding 20 causes terminal B to begin to rise rapidly and causes terminal C to drop even further below ground. This makes the transistor go further into conduction and increases the current flow through winding 13. After a little less than two microseconds it will be seen from waveform (*d*) that the negative saturation level of the core is reached. This is illustrated by a sharp change in slope of the voltage at terminal D. After saturation, terminal D rises more rapidly toward ground since winding 13 is now substantially a short circuit path.

Regeneration stops about the time the negative saturation level is reached in the core. At the two microsecond point in the waveform shown at (*b*), a sharp decline in voltage at terminal B begins. This decline is due to the discharge of capacitor 24 and drives terminal C toward ground. Terminal D reaches its maximum potential at about the time the transistor base arrives at ground potential to turn the transistor off.

It will be seen from the waveform at (*e*) that current flows from source $-Vcc$ and causes terminal E to rise in potential. Terminal E continues to rise even after the transistor is cut off and terminal D begins to drop, thus charging capacitor 17 negatively. However, as more current is drawn from source $-Vcc$, terminal E begins to drop back toward $-Vcc$.

With the core switched to its "0" state, a positive input pulse is applied to winding 11 at write time to switch core 12 back to its "1" state. This pulse begins about three and one-half microseconds after the trigger pulse began. It will be seen that terminals B and C rise well above ground, but of course this keeps the transistor cut off. The potentials at points D and E are substantially unaffected by the resetting of the core to its "1" state. Instead, both terminals tend to return toward their original condition so as to be in readiness for another reading operation.

If the core 12 had originally been set to a "0" condition, a reading operation would produce only slight variations at terminals D and E. The transistor would remain in its off condition since there is little or no regeneration present during such a reading operation.

In the circuit shown in Fig. 1, an output could be taken from either of terminals D or E. However, since terminal D changes by a greater magnitude and at a greater rate, it is perhaps preferable. The output from terminal D can be suitably shaped and supplied to any desired device. Also, an additional winding on the core will supply a useful output signal during core flux change.

Figure 4:
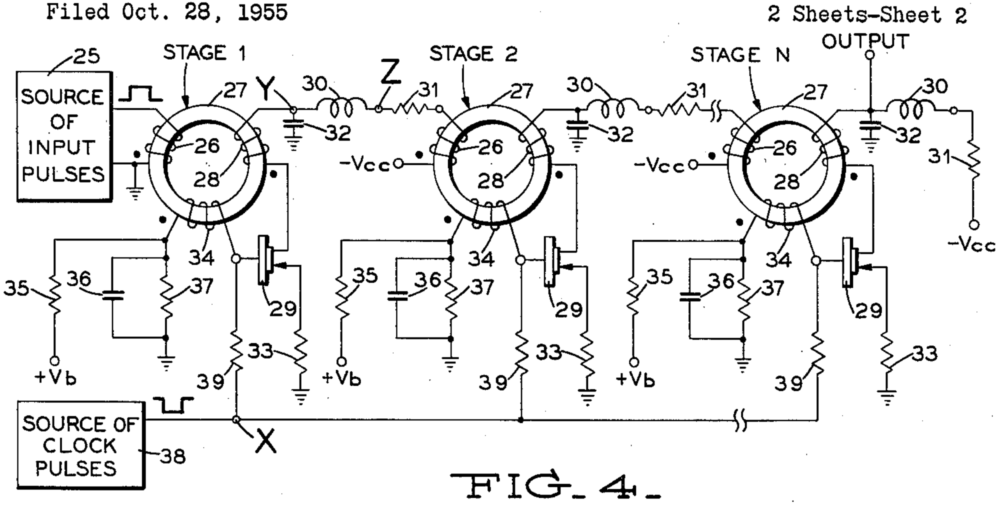
Fig. 4 shows a schematic diagram of a switching arrangement which is used as a shift register.

To this point, only the use of a single core has been discussed. Fig. 4 shows an arrangement of a plurality of the devices of Fig. 1 which are connected into a shift register. A shift register normally comprises a plurality of stages where each stage is capable of assuming either of two stable states. In most conventional shift registers, all stages are turned "off," i.e., returned to their "0" state, by each of a series of recurring clock pulses. If a stage has been "on" and is turned "off" by a clock pulse, it supplies an output pulse to the next stage to turn it "on" at the end of the clock pulse. The first stage is usually under the control of a source of input pulses. Thus, it is possible to move a bit of data from stage to stage at the clock pulse repetition rate. This bit of data emerges from the last stage of the shift register a predetermined time after entering the shift register. In other words, it has been stored for said predetermined time and can now be used for a desired operation.

Fig. 4 shows stages 1, 2 and N of an N stage shift register. The only differences between the individual stages occur in the input to the first stage and the output from the last stage. For this reason, stage 1 will be discussed in detail and similar reference numerals will be provided on similar parts throughout the remaining stages of the circuit. A source of input pulses 25, which is illustrated in block form, is connected to the input winding 26 on a saturable magnetic core 27. The input pulses in the embodiment shown are positive in nature and therefore the occurrence of a pulse switches core 27 from its "0" state to its "1" state. A read or reset winding 28 is provided on core 27 and is arranged in the collector circuit of a PNP transistor device 29. An inductance element 30, a resistor 31 and the input winding 26 of stage 2 are arranged in series between one end of winding 28 and a negative source of D.C. potential $-Vcc$. A capacitor 32 is arranged with one of its sides connected to a point between winding 28 and inductance element 30, the other side of the capacitor being connected to a reference potential which in the present embodiment is shown as ground. The emitter of transistor 29 is connected to ground through a resistor 33.

A regeneration winding 34 is provided on core 27. This winding has one end connected to the base of the transistor and the other end connected through resistor 35 to a positive source of D.C. potential +V*b*. This source serves to normally bias the transistor to an off condition. The said other end of the regeneration winding is also connected to ground through a parallel RC network comprising a capacitor 36 and a resistor 37.

Read or clock trigger pulses are furnished from a source 38 to the base of the transistor through a resistor 39.

It will be seen that the basic circuit just described differs only slightly from the circuit shown in Fig. 1. One difference is the use of the input winding of a second core in the collector circuit of a transistor device associated with a first core. While Fig. 1 showed the read pulses applied through an RC circuit and the regeneration winding to the base of the transistor, the Fig. 4 circuit shows a variation thereof wherein the read pulses are applied to the base through a resistor. Also, the bias voltage +V*b* in Fig. 4 is shown on the opposite side of the regeneration winding. It should be apparent that the method of triggering and the biasing arrangement shown in Fig. 1 could be used in Fig. 4 and vice versa. Also, an additional winding could be provided on each core for initiating regeneration in lieu of the triggering arrangements shown.

The operation of the circuit shown in Fig. 4 will now be described. Assuming that all of the cores are in their "0" state, the first input pulse from source 25 sets core 27 in stage 1 to its "1" state. Thus, stage 1 is said to be "on." At this time stages 2 and N are "off." When the first read pulse from source 38 occurs, the base of transistor 29 is dropped below ground from the +V*b* reference potential, thus causing the transistor to conduct. Current flows from the transistor collector through winding 28 and into capacitor 32 which is normally charged negatively. This current flow causes the ungrounded side of the capacitor to rise toward ground and causes the core of stage 1 to begin its return to the "0" state. By a transformer action the regeneration winding begins to drop the base of the transistor even further below ground which of course makes the core 27 return faster toward its "0" state. When the negative saturation level in core 27 of stage 1 is reached, winding 28 is a very low impedance path for the further discharge of capacitor 32 so that the ungrounded side approaches ground rapidly. Meanwhile, with the negative saturation level reached, the charge on capacitor 36 has a low impedance path through regeneration winding 34 and the transistor base is returned toward ground. When the transistor cuts off, the capacitor 32 has a minimum charge thereon and is thereafter recharged negatively from source −V*cc* through input winding 26 of stage 2. The surge of current through winding 26 causes stage 2 to be turned "on." At the same time a second input pulse from source 25 may set stage 1 to an "on" condition.

The data in the register progresses from stage to stage at the read or clock pulse repetition frequency and emerges from stage N at the indicated output terminal approximately N read pulses after it entered stage 1.

Figure 5:
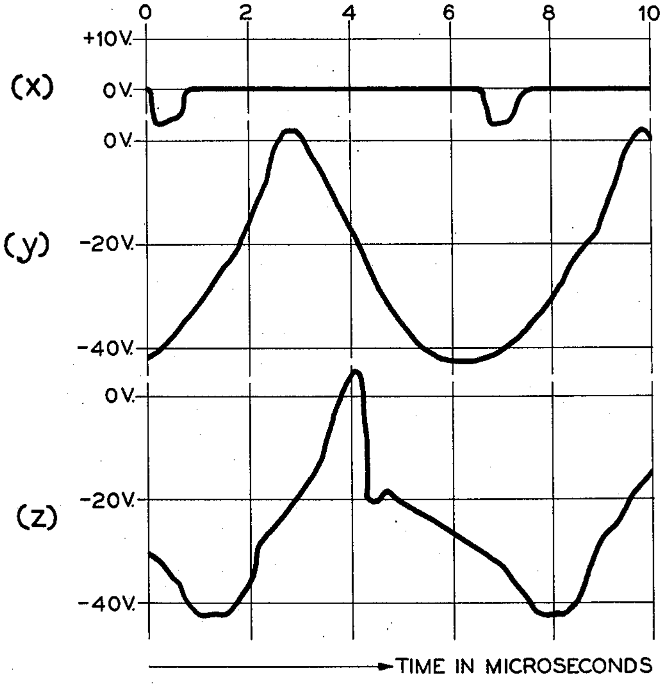
Fig. 5 shows a plurality of waveforms representative of the action at various terminals in Fig. 4 under certain conditions.

The action in the circuit of Fig. 4 wherein a stage is set to a "1" condition by the charge of capacitor 32 associated with a preceding stage is illustrated in Fig. 5. The read pulses illustrated at (*x*) occur at terminal X and are applied through resistor 39 to the base of transistor 29. The waveform shown at (*y*) is representative of the change in potential at terminal Y. It is apparent that the action here is identical with that shown at (*d*) in Fig. 3 for terminal D in Fig. 1. That is, approximately two microseconds after the trigger pulse began, the core has reached its negative saturation level and the potential at terminal Y increases rapidly toward ground thereafter. The waveform shown at (*z*) in Fig. 5 is representative of the change in potential at terminal Z in Fig. 4. Terminal Z begins to drop in potential upon the occurrence of the read pulse. This is due to the fact that some transformer action takes place between windings 28 and 26 in stage 2 when core 27 of stage 2 is driven to negative saturation by regenerative action. Thus, a voltage is induced in winding 26 of stage 2 which momentarily drops the potential at terminal Z. As the transformer action is ending, terminal Z begins to rise. Thereafter, the transistor for stage 1 turns off and capacitor 32 is begun to be charged negatively from −V*cc*. This causes the potential at terminal Z to rise rapidly and peak due to a large current flow through the input winding of stage 2. This large current flow causes stage 2 to be turned "on." After stage 2 is set to this condition the potential at terminal Z drops rapidly since now the input winding of stage 2 offers a low impedance to the current flow which is charging capacitor 32 negatively. After this rapid drop, both of terminals Y and Z drop gradually and capacitor 32 is returned to its negatively charged condition.

From the above-detailed description it will be seen that there has been produced a switching device which combines the advantage of both magnetic cores and transistors. This device is triggered into regeneration by a low level, short duration trigger pulse. Regenerative action reads the core. The present invention, in contrast to prior art devices, does not require the transfer of energy by transformer action to the output circuit. Instead, a capacitor is furnished which has a normal condition to provide the necessary voltage for the regenerative action. This capacitor is changed from the normal condition by the regenerative action. It is after regeneration, with the core switched, that current is drawn from a source to return said capacitor to its normal condition. This action produces an output signal. This output signal could be supplied to the succeeding stage of a shift register as in the embodiment shown. While the present invention has been shown to utilize PNP transistors, it is apparent that NPN transistors could be substituted therefor, the only changes required being those well known to those persons skilled in the art.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a logical switching device comprising a core of magnetic material capable of assuming alternate states of stability, an input signal winding capable of setting said core to one of said stable states, a signal translating device including an input circuit and an output circuit, a readout winding on said core having one end thereof connected to said output circuit, an energy storage device connected to the other end of said readout winding and through a resistive medium to a reference potential, a regeneration winding on said core, and triggering means, said triggering means and said regeneration winding being connected to said input circuit, said triggering means being capable of energizing said signal translating device and said regeneration winding, the energizing of said signal translating device releasing energy from said storage device through said readout winding and said signal translating device, said storage device returning to its normal condition when regeneration is completed.

2. In a logical switching device comprising a core of magnetic material capable of assuming alternate states of stability, an input signal winding capable of setting said core to one of said stable states, a signal translating device including an input circuit and an output circuit, a readout winding on said core having one end thereof connected to said output circuit, an energy storage device connected to the other end of said readout winding and through a resistive medium to a source of potential, said input circuit including a regeneration winding on said core, triggering means connected to said input circuit for supplying a triggering pulse thereto, said triggering pulse energizing said signal translating device and said regeneration winding, the energizing of said signal translating device energizing said readout winding and releasing energy from said storage device through said readout winding and said signal translating device, and means connected to said regeneration winding for turning the signal translating device off when feedback in the regeneration winding is complete.

3. In a logical switching device comprising a core of magnetic material capable of assuming alternate states of stability, an input signal winding capable of setting said core to one of said stable states, a signal translating device including an input circuit and an output circuit, a readout winding on said core having one end thereof connected to said output circuit, an energy storage device connected to the other end of said readout winding and through a resistive medium a source of potential, a regeneration winding on said core, triggering means connected to said input circuit for supplying a triggering pulse thereto, said triggering pulse energizing said signal translating device and said regeneration winding, the energizing of said signal translating device energizing said readout winding and releasing energy from said storage device through said readout winding and said signal translating device, means connected to said regeneration winding for turning the signal translating device off by way of said regeneration winding when feedback in the regeneration winding is complete, and means for maintaining said signal translating device off until the next triggering time.

4. In a logical switching apparatus comprising first and second cores of magnetic material, each of said cores being capable of assuming alternate states of stability, an input signal winding on each of said first and second cores, a signal translating device having an input circuit and an output circuit, the readout winding on said first core and the input winding of said second core being connected to said output circuit, an energy storage device connected to one end of said readout winding and through the input winding of said second core to a source of potential, a regeneration winding on said first core connected to said input circuit, and triggering means for said signal translating device, the triggering of said signal translating device energzing said readout winding and releasing energy from said storage device through said readout winding and said signal translating device, said storage device returning to its normal condition when regeneration is completed by current flow through the input winding on said second core from said source of potential, thereby changing the state of said second core.

5. In a logical switching device comprising a core of magnetic material capable of assuming alternate states of stability, an input signal winding capable of setting said core to one of said stable states, a signal translating device having an input circuit and an output circuit, a readout winding on said core connected to said output circuit and energized when said signal translating device conducts, a capacitor set to a normal condition by a source of potential and having one side thereof connected to said readout winding, said one side being substantially at the potential of said source when said capacitor is in its normal condition, and triggering means connected to said signal translating device and including a regeneration winding on said core, the triggering of said signal translating device energizing said readout winding by drawing energy from said capacitor through said readout winding and said signal translating device, said capacitor being returned to its normal condition from said source when regeneration is completed.

6. A logical switching device comprising a core of magnetic material capable of assuming alternate states of stability, an input signal winding on said core energized from a source capable of setting said core to one of said stable states, a transistor device having a source of potential thereacross and including an input circuit and an output circuit, a reset winding on said core connected to said output circuit which is energized when said transistor device conducts, a capacitor normally charged from said source and having one side thereof connected to said reset winding, and triggering means for said transistor device including a regeneration winding on said core, the triggering of said transistor device energizing said reset winding and discharging said capacitor through said reset winding and said transistor device, said capacitor recharging from said source when regeneration is completed to provide an output signal.

7. A logical switching device comprising a core of magnetic material capable of assuming alternate states of stability, an input signal winding on said core energized from a source capable of setting said core to one of said stable states, a transistor device having a source of potential thereacross and a reset winding on said core connected to said transistor which is energized when said transistor device conducts, a capacitor normally charged from said source and having one side thereof connected to said reset winding, and triggering means for said transistor device including a regeneration winding on said core connected to said transistor device, means for applying trigger pulses to said transistor device through said regeneration winding for setting said core to a stable state opposite to that state to which the input winding sets the core, the triggering of said transistor device energizing said reset winding and discharging said capacitor through said reset winding and said transistor device, said capacitor recharging from said source when regeneration is completed to provide an output signal.

8. A logical switching device comprising a core of magnetic material capable of assuming alternate states of stability, an input signal winding on said core energized from a source capable of setting said core to one of said stable states, a transistor device having a source of potential thereacross and a reset winding on said core connected to said transistor device which is energized when said transistor device conducts, a capacitor normally charged from said source and having one side thereof connected to said reset winding, and triggering means for said transistor device including a regeneration winding on said core connected to said transistor device, means for applying trigger pulses through said regeneration winding to said transistor device including a storage device on the trigger input side of said regeneration winding, the triggering of said transistor device energizing said reset winding and discharging said capacitor through said reset winding and said transistor device, said storage device releasing its energy through said regeneration winding when regeneration is completed for aiding in turning said transistor device off.

References Cited in the file of this patent

UNITED STATES PATENTS

| | | |
|---|---|---|
| 2,710,928 | Whitney | June 14, 1955 |
| 2,747,110 | Jones | May 22, 1956 |
| 2,760,088 | Pittman | Aug. 21, 1956 |